United States Patent [19]

Inoue

[11] Patent Number: 5,237,410
[45] Date of Patent: Aug. 17, 1993

[54] VIDEO SIGNAL ENCODING APPARATUS UTILIZING CONTROL OF QUANTIZATION STEP SIZE FOR IMPROVED PICTURE QUALITY

[75] Inventor: Ikuo Inoue, Yokohama, Japan

[73] Assignee: Matsushita Electric Industrial Co., Ltd., Osaka, Japan

[21] Appl. No.: 799,788

[22] Filed: Nov. 29, 1991

[30] Foreign Application Priority Data

Nov. 28, 1990 [JP] Japan ................................ 2-332370

[51] Int. Cl.⁵ .............................................. H04N 7/13
[52] U.S. Cl. ..................................... 358/136; 358/135
[58] Field of Search ............................... 358/136, 135

[56] References Cited

U.S. PATENT DOCUMENTS

| | | | |
|---|---|---|---|
| 4,829,376 | 5/1989 | Hammer | 358/136 X |
| 4,941,043 | 7/1990 | Jass | 358/136 X |
| 5,010,401 | 4/1991 | Murakami et al. | 358/136 |

OTHER PUBLICATIONS

"Adaptive Coding of Monochrome and Color Images" by Wen-Hsiung Chen et al IEEE Transactions on Communications, vol. COM-25, No. 11, Nov. 1977; pp. 1285-1292.

Rec. H.221, "Frame Structure for a 64 kbit/s Channel in Audiovisual Teleservices" Melbourne, 1988.
Rec. H.261, "Codec for Audiovisual Services at n×384 kbit/s" Melbourne, 1988.

Primary Examiner—Victor R. Kostak
Attorney, Agent, or Firm—Lowe, Price, LeBlanc & Becker

[57] ABSTRACT

A video signal encoding apparatus of the type in which inter-frame difference values for respective picture elements are subjected to orthogonal transform processing and the resultant transform coefficients are quantized and encoded, with respective values of quantization step size applied to successive 2-dimensional blocks of picture element values being varied such as to control the encoded data bit stream to a constant bit rate, in which the quantization step size for each block is also controlled in accordance with whether or not the block lies on a border between a visually smooth region of the picture expressed by the video signal and a region in which substantial changes occur in the picture. The step size can thereby be set to be sufficiently small, in the case of specific blocks for which is necessary to use a small size of quantization step in order to prevent noise from appearing in the picture obtained from the decoded video signal.

3 Claims, 5 Drawing Sheets

VIDEO SIGNAL ENCODING APPARATUS UTILIZING CONTROL OF QUANTIZATION STEP SIZE FOR IMPROVED PICTURE QUALITY

BACKGROUND OF THE INVENTION

1. Field of the Invention

The present invention relates to an adaptive encoding apparatus for high-efficiency encoding of a video signal.

2. Description of the Prior Art

As a result of advances which have been made in digital signal technology, corresponding advances have been achieved in achieving highly efficient encoding of video signals such as television signals, for transmitting a video signal over a digital communication line, or storage of the video signal data on a digital recording medium such as a CD ROM or CD-I. Recently, international standards have been proposed for the encoding of video signals representing static pictures, and for adaptive encoding of video signals representing moving pictures, for data transmission or recording purposes. Most of these proposals for high-efficiency encoding of video signals are based on the use of the discrete cosine transform, using an algorithm whereby difference values between corresponding picture element values of successive frames of a video signal are converted to respective transform coefficients, which are quantized and encoded. An example of a video signal encoding apparatus which utilizes the discrete cosine transform is described in the CCITT Recommendation H.261 entitled "Codec for Audiovisual Services at n×64 kbit/s" (Melbourne, 1988). To provide a clear understanding of the prior art problem that is to be overcome by the present invention, the basic features of such a prior art encoding apparatus will be described in detail in the following, referring to the drawings.

FIG. 1 shows the general configuration of that prior art video encoding apparatus. Although the apparatus is intended for encoding both audio and video information, only the video information aspect will be described. In FIG. 1, numeral 111 denotes a video signal input terminal, 100 denotes a block conversion section for local conversion of each frame of the input video signal into a set of blocks of picture element values. Numeral 101 denotes a prediction function judgement section, for judging whether a prediction function that is applied to a block that is currently being encoded shall be obtained by intra-frame prediction or be obtained on the basis of motion-compensated inter-frame prediction. Numeral 114 denotes a subtractor, for subtracting a prediction signal from the input video signal to obtain a prediction error signal, and 102 denotes an orthogonal transform section which executes 2-dimensional orthogonal transform processing of the input video signal or of the prediction error signal, in units of blocks. Numeral 103 denotes a quantizer section which quantizes the successive transform coefficients that are derived by the orthogonal transform section 102, with a quantization step size that is determined by an output signal from a quantization step size calculation section 104, to thereby obtain respective quantization index values. Numeral 104 denotes a quantization step size calculation section, for calculating respective values of quantization step size for each block, in accordance with the amount of encoded data that currently remain in a buffer memory section 110 (i.e. data that are still to be transmitted by the apparatus). Numeral 105 denotes a dequantizer section which derives respective quantized values from the quantization index values, by executing the inverse procedure to that of the quantizer section 103. An inverse orthogonal transform section 106 receives these quantized values, and executes inverse transform processing to that executed by the orthogonal transform section 102, to thereby reproduce the input signal supplied to the orthogonal transform section 102, i.e. to obtain a reproduced video signal or a reproduced prediction error signal. That reproduced output signal from the inverse orthogonal transform section 106 is added to the input video signal or the prediction error signal in an adder 124, to thereby obtain a reproduced video signal. A motion compensated prediction section 107 executes motion compensation of the reproduced video signal of the preceding frame, to obtain a motion compensated prediction signal. A loop filter 108 executes 2-dimensional low-pass filter processing of the motion compensated prediction signal. An encoding section 109 encodes the quantization index values for the respective transform coefficients, and also encodes the motion vector, prediction function judgment result, quantization step size, and loop filter in-circuit/out-of-circuit indication signals, and multiplexes the resultant code data into a specific format, referred to as the transmission frame. A buffer memory section 110 serves to temporarily hold the output data from the encoding section 109, before the data are transferred to an output terminal 139.

The operation of the above prior art apparatus is as follows. An input video signal 112 supplied to the input terminal 111 consists of successive picture element luminance and chrominance values, and represents a picture having a ratio of the number of picture elements along the horizontal direction to the number of picture elements along the vertical direction that is equal to 2:1. In the block conversion section 100 the input video signal is locally divided into units of blocks, to obtain an output video signal 113. The basic block unit is referred to as a macroblock, which consists of four (8×8) blocks of picture element luminance values corresponding to a picture array of (16×16) picture elements, and a pair of (8×8) blocks of picture element chrominance values (i.e. a U block and a V block). Each of these blocks of chrominance (8×8) values corresponds to the aforementioned picture area array of (16×16) picture elements. A sequence of six of these (8×8) blocks is thus generated for each macroblock, from the block conversion section 100, as the video signal 113.

The motion compensated prediction section 107 compares the video signal 113 with the reproduced video signal of the preceding frame (which has been stored in the motion compensated prediction section 107) in units of macroblocks, to obtain the position within the macroblock for which the least amount of inter-block error occurs, and outputs that amount of displacement as the motion vector, to thereby produce the motion vector signal 132. If, when the inter-block error is compared with that for the case of zero displacement, it is found that motion compensation will not result in a reduction of the error, then it is possible to forcibly set the value of motion vector to zero. The motion compensated prediction section 107 also derives (for each macroblock) the reproduced video signal of the preceding frame, shifted in position by an amount equal to the motion vector that has been obtained for that macroblock, and outputs the result. The output values thus obtained constitute the motion compensated prediction signal 126.

The motion compensated prediction signal 126 is inputted to the loop filter section 108, to be either subjected to 2-dimensional low-pass filtering, to thereby reduce the block distortion which arises between adjacent blocks, or to be transferred through the loop filter section 108 without being filtered. The result is outputted as the inter-frame prediction signal 127. The decision as to whether or not the 2-dimensional low-pass filtering is to be applied is based upon whether the size of the motion vector is zero or other than zero. A filter processing signal 133 is outputted from the motion loop filter 108 to provide an indication as to whether or not the filter processing is actually applied.

The subtractor 114 subtracts the inter-frame prediction signal 127 from the input video signal 113, to obtain as output the inter-frame prediction error signal 116. The prediction function judgement section 101 executes, for each block of the input video signal 113, intraframe prediction using the average value of the block as a prediction value, and inter-frame prediction using the inter-frame prediction signal 127 as a prediction value, and compares the respective values of prediction error that result from these two prediction functions, to determine which prediction function (i.e. that which results in the smallest amount of error) is to be selected for use with that block. A prediction function selection signal 134 is outputted from the prediction function judgement section 101 in accordance with the result of that determination.

The switch 118 is controlled by the prediction function selection signal 134 such that, when intra-frame prediction is to be selected, the input terminal 115 of switch 118 is set so that the input video signal 113 is selected to be supplied to the orthogonal transform section 102 as signal 119. Conversely when the prediction function selection signal 134 indicates that interframe prediction is to be selected, the input terminal 117 of switch 118 is set, so that the inter-frame prediction error signal 116 is selected to be the orthogonal transform section input signal 119. The switch 130 is similarly controlled in accordance with the state of the prediction function selection signal 134, such that when intra-frame prediction is to be selected, the input terminal 129 of switch 130 is set so that a value of zero is outputted as the prediction signal 131. Conversely when the prediction function selection signal 134 indicates that inter-frame prediction is to be selected, the input terminal 128 of switch 130 is set, so that the interframe prediction signal 127 is selected to be the prediction signal 131.

In the orthogonal transform section 102, the orthogonal transform section input signal 119 is subjected to 2-dimensional orthogonal transform processing to obtain resultant transform coefficients 120. A specific example of an orthogonal transform method is the Discrete Cosine Transform, which enables highly efficient encoding to be achieved using practical hardware. The 2-dimensional Discrete Cosine Transform is expressed by equation (1) below. In the prior art encoding apparatus example being described here, N has a value of 8.

$$F(u,v) = \frac{16C(u)C(v)}{N \cdot N} \cdot \sum_{j=0}^{N-1} \sum_{k=0}^{N-1} f(j,k) \cdot \qquad (1)$$

$$\cos\frac{(2j+1)u}{2N}\pi \cdot \cos\frac{(2k+1)v}{2N}\pi$$

In equation (1), j and k are spatial coordinates in the picture element space, u, v are coordinates in the transform space, f(j, k) is the input video signal or the interframe prediction error signal, F(u, v) is the transfer coefficient, and C(w) is a value that is given by equation (2) below.

$$C(w) = \begin{cases} 1/\sqrt{2} & (w = 0) \\ 1 & (w \neq 0) \end{cases} \qquad (2)$$

In the quantization step size calculation section 104, the value of the quantization step size is calculated by using equation (3) below, in accordance with the residual code quantity 137 within the buffer memory section 110.

$$Qstep = 2 \cdot INT[Buf/(200 \cdot q)] + 2 \qquad (3)$$

In equation (3), Qstep denotes the quantization step size, INT[ ] denotes a function which derives an integer value of the quantity within [ ], Buf denotes the residual code quantity within the buffer memory section 110, q denotes an encoding speed parameter which is related to the encoding speed V by equation (4) below.

$$V = q \times 64 kbit/sec \qquad (4)$$

In the quantizer section 103, each orthogonal transform coefficient 120 is quantized using a quantization step size that is calculated by the quantization step size calculation section 104, and the resultant quantization index value 121 is then derived. The quantization step size is selectively varied as described hereinafter, however a fixed step size is used within each block. In the dequantizer section 105, the quantization value 122 corresponding to a quantization coefficient is calculated, based on the quantization index value 121 and quantization step size 135.

In the inverse orthogonal transform section 106, a transform operation is executed which is the inverse of the transform operation executed by the orthogonal transform section 102, to thereby obtain the inverse orthogonal transform output 123. In the case of the 2-dimensional Discrete Cosine Transform being used, the inverse transform operation executed by the inverse orthogonal transform section 106 is expressed by the following equation (5) for the 2-dimensional inverse Discrete Cosine Transform:

$$f(j,k) = \frac{1}{4} \cdot \sum_{u=0}^{N-1} \sum_{v=0}^{N-1} C(u)C(v)F(u,v) \cdot \qquad (5)$$

$$\cos\frac{(2u+1)j}{2N}\pi \cdot \cos\frac{(2v+1)k}{2N}\pi$$

The adder 124 adds together the inverse orthogonal transform output 123 and the prediction signal 131, to obtain the reproduced video signal 125, which is then temporarily stored in the memory within the motion compensated prediction section 107. In the encoding section 109, the quantization index values produced from the quantizer section 103 are successively processed in units of blocks. The values within a block are successively examined from beginning to end in a particular sequence, with that operation being referred to as zig-zag scanning, to thereby efficiently detect respective sequences of zero values within the block. Each such "run" of zeros, in combination with the non-zero value which ends that "run" is then converted into a variable-length code value or a combination of a fixed-length code and variable-length code value, by 2-dimensional encoding using a reference code table.

The motion vector signal 132 is encoded as follows. For each macroblock, the respective differences between the horizontal and vertical components of the motion vector of that macroblock and those of the motion vector of the immediately preceding macroblock are calculated, and these values are then converted to variable-length code by using a reference code table.

The quantization step size 135, filter processing discrimination signal 133, the prediction function selection signal 134, and any other data which will be necessary at the time of decoding, are encoded in a similar manner to that described above.

The various code data thus obtained can be combined in transmission frame format in accordance with CCITT Recommendation H.221 (entitled "Frame Structure for a 64 kbit/s Channel in Audiovisual Teleservices", Melbourne, 1988), as the bit stream 136. The transmission frames, produced at irregular timings, are temporarily held in the buffer memory section 110 before being outputted to the transmission path via the output terminal 139 in order to output the data at a fixed bit rate, as the bit stream 138. The number of bits which currently are being held in the buffer memory section 110 is outputted therefrom as the residual code quantity 137

A prior art apparatus of the type described hereinabove has the following disadvantage. The quantization step size is determined only by the current value of the residual code quantity 137 in the output buffer, i.e. the step size is varied, from block to block, such as to ensure that a constant bit rate will be obtained for the encoded data stream. In addition, in order to make the bit rate of the encoded data as low as possible, the average value of the step size must be made as large as possible, consistent with acceptable picture quality being obtained from the resultant decoded video signal. However it is found that a specific type of noise occurs in the displayed picture that is obtained from such a system, when the step size of a specific region is made large. Within each region of the picture which is visually smooth in texture (i.e. each region within which the luminance and chrominance values of the video signal are relatively constant) and which adjoins a region within which abrupt variations in the picture occur, or which adjoins a region which differs greatly from it in luminance and/or chrominance, a specific type of noise (known as "mosquito noise" and appearing as spurious patterns in the displayed picture) is produced at the boundary between the regions. The noise pattern is made clearly visible within the region of substantially smooth texture, and so is highly conspicuous. Such a problem occurs due to the fact that the Discrete Cosine Transform operation, being a transform into the frequency domain, produces transform coefficients which are low in amplitude for the case of high-frequency components of the signal that is operated on, so that these high-frequency components may be eliminated if the quantization step size is large. That results in overshoot or undershoot effects occurring in those parts of the resultant decoded video signal which correspond to the aforementioned boundaries.

The problem is basically due to the method of setting the quantization step size in such a prior art encoding apparatus, whereby the step size is only controlled such as to stabilize the bit rate of the outputted code data, with no consideration given to the visual effects which may occur in the aforementioned blocks which are situated on boundaries between different regions.

SUMMARY OF THE INVENTION

It is an objective of the present invention to overcome the problem of a prior art video signal encoding apparatus described above, by providing a video signal encoding apparatus whereby the aforementioned "mosquito" noise is substantially reduced, providing an overall substantial improvement in the visual quality of the resultant displayed picture that is obtained from a decoded video signal.

To achieve the above objective, the present invention provides a video signal encoding apparatus comprising:

block conversion means for arranging an input video signal into successive units of blocks, each block formed of a fixed plurality of picture element values;

means for subtracting an intra-frame prediction signal from a block-arranged input video signal produced from the block conversion means, to obtain an inter-frame prediction error signal;

orthogonal transform means for executing orthogonal transform processing of the intra-frame prediction error signal to obtain successive orthogonal transform coefficients;

quantizer means for quantizing the orthogonal transform transform coefficients to obtain respective quantization index values;

quantization step size calculation means for calculating, for each of the blocks, a value of quantization step size to be used by the quantizer means in quantizing the block;

encoding means for encoding the quantization index values and quantization step size values;

buffer memory means for temporarily holding code data produced from the encoding means, before transfer to an output terminal and for producing an output signal indicative of an amount of residual code data within the buffer memory means;

dequantizer and inverse transform means for operating on the quantization index values to obtain an inverse orthogonal transform signal;

means for adding the inter-frame prediction signal to the inverse orthogonal transform signal in accordance with results obtained from the prediction function judgement section, to obtain a reproduced video signal; and means for operating on the reproduced video signal to obtain the inter-frame prediction signal;

and is characterized in comprising region boundary detection means for operating on the block-arranged video signal from the block conversion means to derive, for each of the blocks, a corresponding region boundary detection value to indicate whether or not the block lies on a boundary between a picture region of substantially smooth visual texture and a region in which large-scale changes in video signal level occur, wherein the quantization step size calculation means calculates the quantization step size for each of the blocks in accordance with the region boundary detection value and the residual amount of code data, in combination.

The region boundary detection means preferably comprises:

feature parameter extraction means for extracting, for each of the blocks, a corresponding value of a parameter which is indicative of visual characteristics;

threshold judgement means for comparing each of the parameter values with a predetermined threshold value, for assigning each of the blocks to one of a plurality of different classification values of visual quality; and boundary judgement means for operating upon the classification values to judge, for each of the blocks, whether or not the block is positioned on a boundary between regions having respectively different classification values.

Thus the present invention enables reliable detection of blocks for which there is a possibility of "mosquito" noise arising, with resultant deterioration of image quality of a picture derived from the decoded video signal, and enables the quantization step size applied to each block of video signal data by the encoding apparatus to be adjusted in accordance with whether or not the block lies on a boundary between specific types of region. A substantial improvement in visual quality of the finally obtained picture can thereby be achieved.

Specifically, the features of local regions of the picture represented by the video signal are extracted in units of blocks, and the results are used to detect each block which is situated on a boundary between a region of smooth visual texture and a region in which sudden changes in the picture occur. When such a block is detected, the quantization step size (which is utilized to quantize the transform coefficient values obtained for that block) is made relatively small, resulting in a greater amount of encoded data being generated for that block in the encoded data bit stream that is outputted from the encoder apparatus, whereas in the case of a block which does not lie on such a boundary, the quantization step size is made relatively large, so that a smaller amount of encoded data is generated for each such block.

Hence, an overall high efficiency of encoding can be maintained with the present invention, in spite of the increase in picture quality that is achieved.

BRIEF DESCRIPTION OF THE DRAWINGS

FIG. 5A is an example of a set of threshold judgement result values and FIG. 5B shows corresponding region boundary detection values, obtained by the region boundary detection section of FIG. 3, for respective blocks of an input video signal.

DESCRIPTION OF PREFERRED EMBODIMENTS

Figure 1:
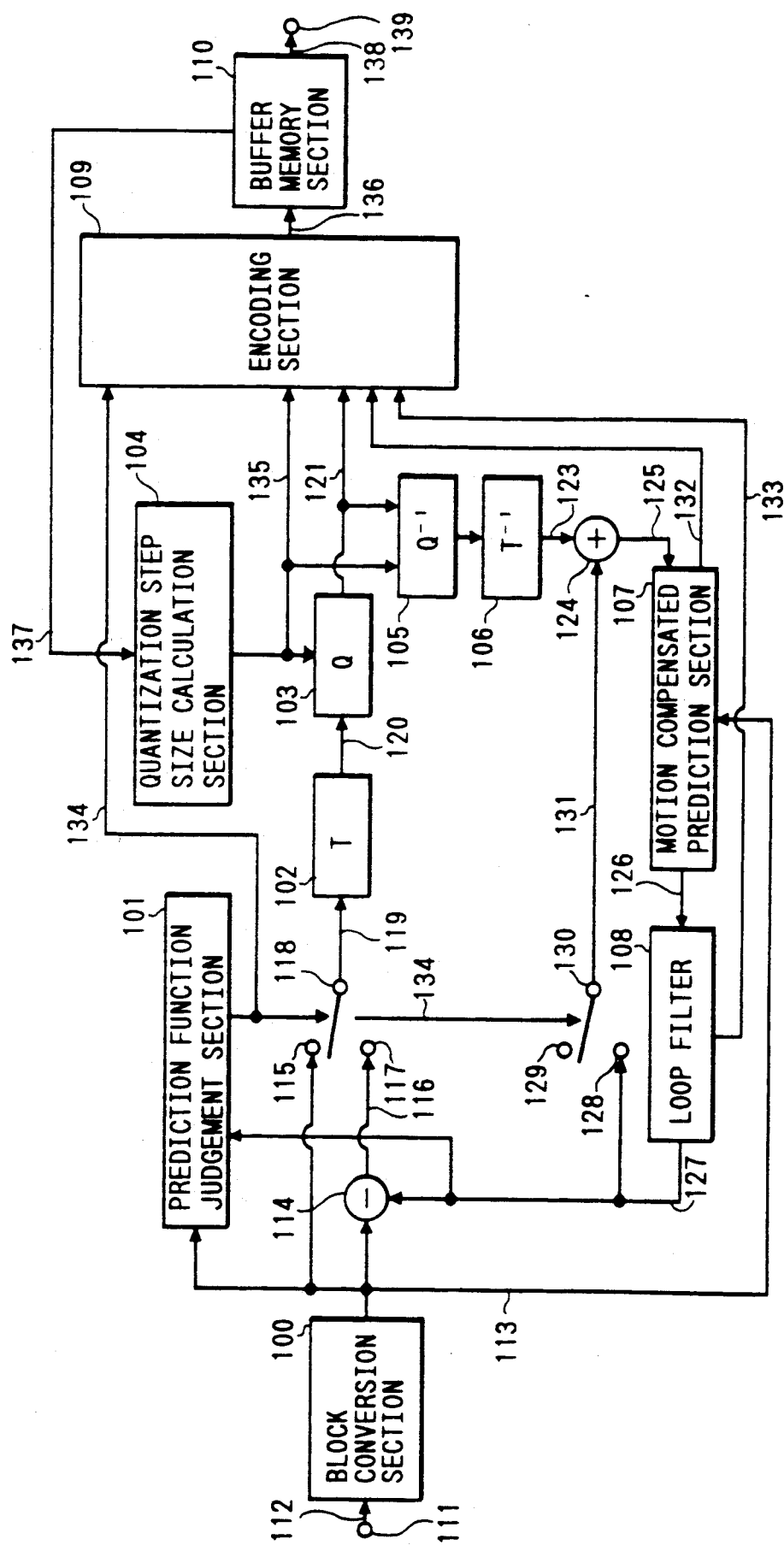
FIG. 1 is a general block diagram of a prior art example of a video signal encoding apparatus.
Figure 2:
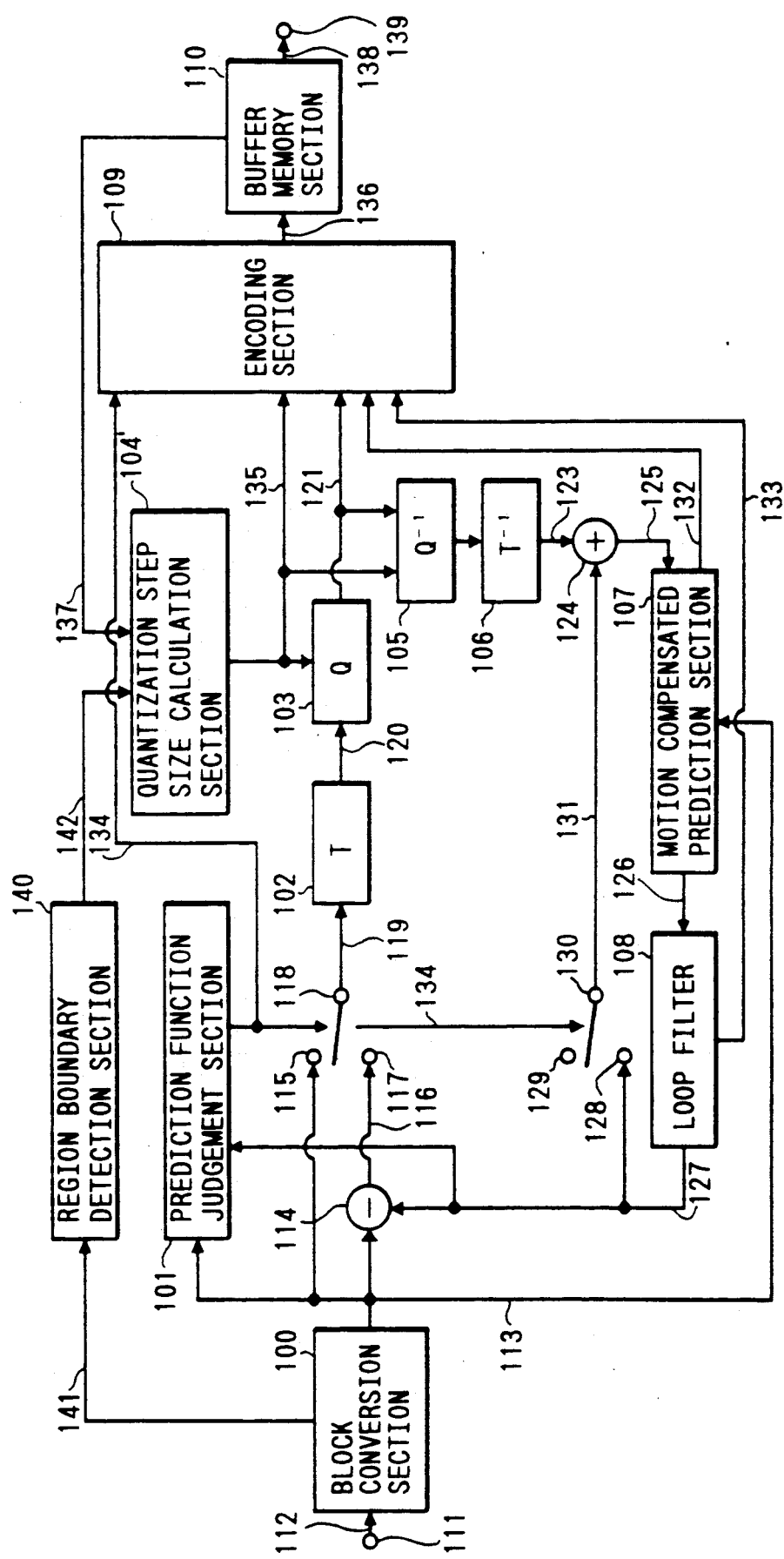
FIG. 2 is a general block diagram of an embodiment of a video signal encoding apparatus according to the present invention.

A first embodiment of a video signal encoding apparatus according to the present invention will be described referring to the general block diagram of FIG. 2. In FIG. 2, circuit blocks corresponding to circuit blocks in the prior art example of FIG. 1 described hereinabove are designated by identical reference numerals to those of FIG. 1, and detailed description of these will be omitted. The embodiment differs from the prior art example of FIG. 2 in being provided with a region boundary detection section 140, and further differs in that the quantization step size calculation section 104' of the embodiment is controlled in accordance not only with the aforementioned signal 137 from the buffer memory section 110 indicating the amount of code remaining in the buffer memory section 110, but also in accordance with an output signal 142 produced from the region boundary detection section 140, as described in detail in the following.

The quantization step size calculation section 104 is coupled to receive the input video signal produced from the block conversion section 100, and operates on that video signal in units of blocks, to extract local features represented by the data of each block. Basically, the quantization step size calculation section 104 judges whether the digital data values of a block correspond to the features of one of two possible different types of display picture region, and detects whether the block is positioned on a boundary between two of these different types of region. A region boundary detection result signal 142 is outputted from the region boundary detection section 140, which indicates the result of such a judgement operation for each of the successive blocks.

Figure 3:
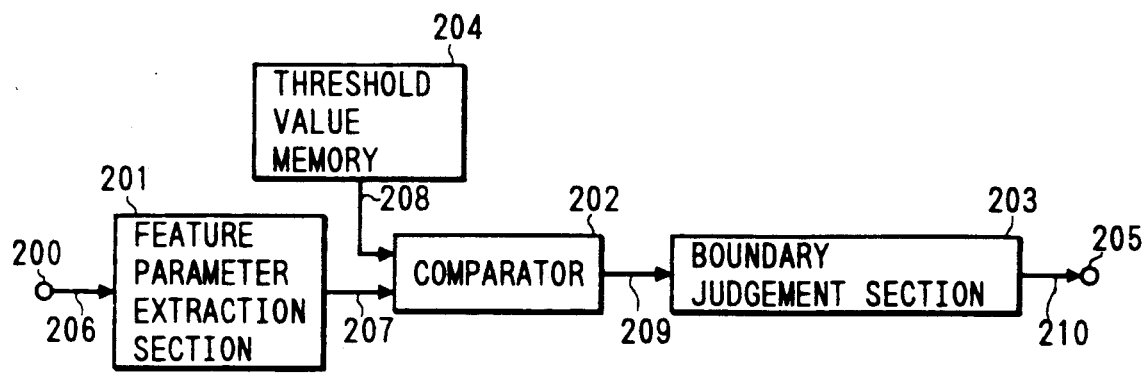
FIG. 3 is a block diagram of a region boundary detection section in the embodiment of FIG. 2.

The configuration and operation of the region boundary detection section 140 will be described referring to the block diagram of FIG. 3, in which 200 denotes an input terminal to which the input video signal is supplied from the block conversion section 100, to be supplied to a feature parameter extraction section 201. An output signal 207 produced from the feature parameter extraction section 201 is inputted to a comparator 202, and a resultant output signal 209 produced from the comparator section 202 is inputted to a boundary judgement section 203. Data held in a threshold value memory 204 are also inputted to the comparator 202, as a signal 208. An output signal 210 of the boundary judgement section 203 is supplied to an output terminal 205.

Figure 4:
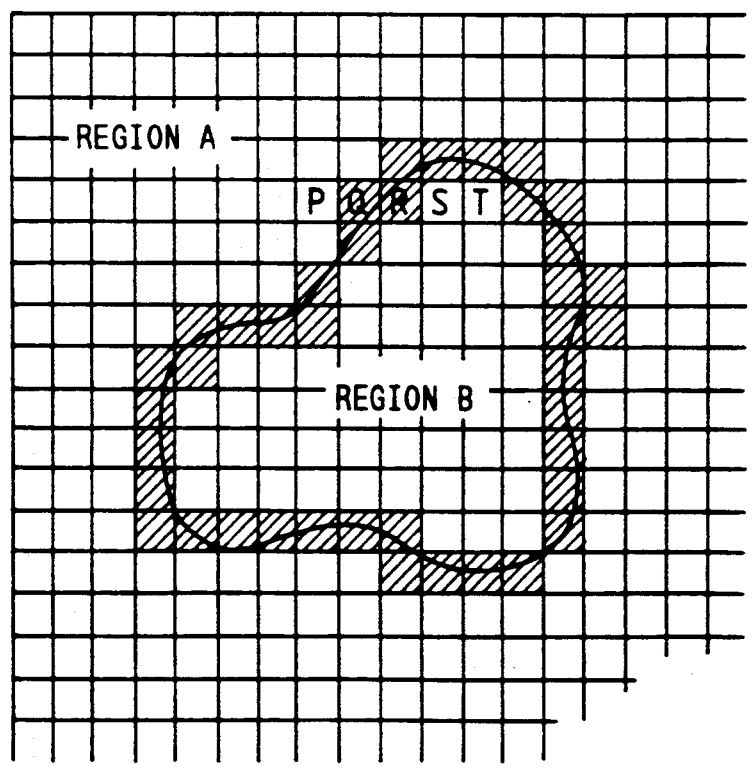
FIG. 4 is a diagram for assistance in describing the operation of the region boundary detection section of FIG. 3, illustrating an example of output values produced from that section.

The operation of the circuit of FIG. 3 will be described based on a specific example of a picture region (i.e. a portion of one frame of the input video signal) which is shown in FIG. 4. In FIG. 4 each of the small rectangles which are shown as forming a uniform rectangular grid represents one block of the input video signal, where each block consists of a (16×16) set of macroblock luminance values of picture elements of a frame of the video signal (arranged by the block conversion section 1 as described hereinabove). It is assumed that this portion of the picture consists of two different regions A and B, having a smooth visual texture and an extremely rough visual texture (i.e. corresponding to large-amplitude changes in video signal level), respectively. Video signal picture element blocks that are shown in hatched-line form are blocks which lie along the boundary between the regions A and B. The circuit shown in FIG. 3 judges, for each of the blocks shown in FIG. 4, whether or not the block is positioned on that boundary. Firstly, in the feature parameter extraction section 201, a dispersion value $\sigma^2$ is derived for each block, which is a parameter expressing the characteristic features (e.g. rough or smooth visual texture) of the input video signal that is applied to the input terminal 200. The calculated values of $\sigma^2$, designated as a signal 207, are outputted from the feature parameter extraction section 201. In the case of blocks within a region having a uniform visual texture, the dispersion values will be small, whereas if there are large-amplitude changes in luminance within the region then the dispersion values will be large. The value of the dispersion value $\sigma^2$ of a block is given by equation (6) below.

$$\sigma^2 = \frac{1}{N \cdot N} \cdot \sum_{j=0}^{N-1} \sum_{k=0}^{N-1} (f(j,k) - a)^2 \qquad (6)$$

In equation (6), j and k signify spatial coordinates of a picture element within the block, f(j, k) denotes the luminance value of that picture element, N denotes the total number of picture elements along each of the horizontal and vertical dimensions of the block, and "a" denotes the average value of the picture element luminance values within the block, i.e. "a" is obtained as:

$$a = \sum_{i=0}^{15} \sum_{j=0}^{15} f(i,j)$$

The comparator 202 compares each dispersion value 207 with a threshold value 208 that is read out from the threshold value memory 204. The result of that comparison is outputted as a threshold judgement result 209. If the dispersion value of a block is greater than the threshold value, then a logical "1" is outputted as the result 209, while otherwise "0" is outputted.

In the boundary judgement section 203, the respective values of threshold judgement results obtained for the 8 blocks which are peripherally immediately adjacent to the block that is currently being processed are used in a calculation in accordance with the equation (7) below, for judging whether or not the block that is currently being processed is positioned on a boundary between two different regions such as the regions A and B of FIG. 4 described hereinabove. A block which lies on such a boundary will be referred to in the following as a region boundary block. The result D that is obtained from equation (7) for a block is outputted from the boundary judgement section 203 as a region boundary block detection value 210. If the region boundary block detection result D indicates that the block which is currently being processed is a region boundary block, then the region boundary block detection value 210 takes the value "1", and otherwise is "0".

$$D = \begin{cases} 1 & \left( \prod_{m=0}^{2} \prod_{n=0}^{2} s(m,n) = 0 \right) \\ s(1,1) & \text{(Otherwise)} \end{cases} \qquad (7)$$

Figures 5A, 5B:
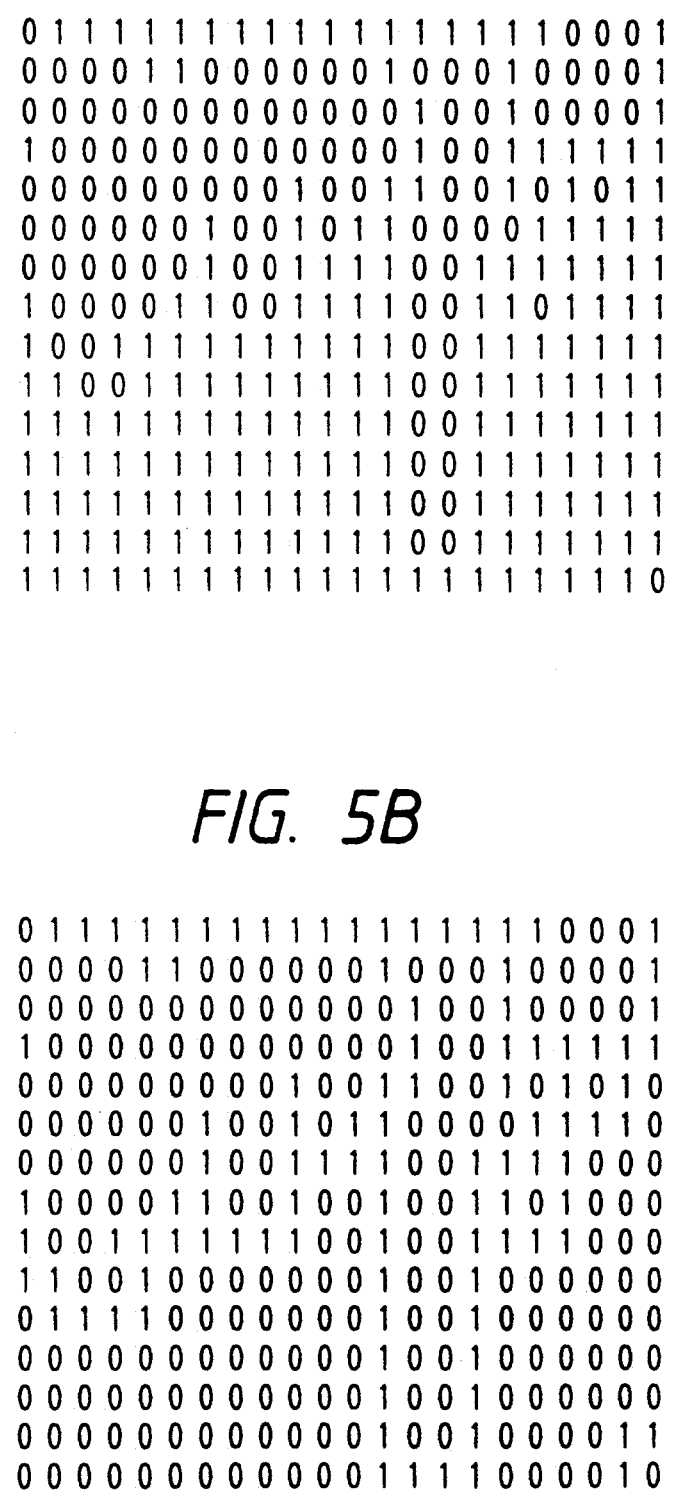

In equation (7), s(1, 1) denotes the threshold judgement result for the block that is currently being processed, and s(m, n) denotes the respective threshold judgement results for the aforementioned eight peripheral blocks surrounding the block that is being processed. FIG. 5A shows an example of threshold judgement value results produced from the comparator 202 in FIG. 3 (i.e. "1" or "0" threshold judgement values obtained for respective blocks of an input video signal), while FIG. 5B shows the corresponding region boundary detection results (i.e. respective "1" or "0" region boundary detection result values produced from the boundary judgement section 203 in FIG. 3).

Figure 6:
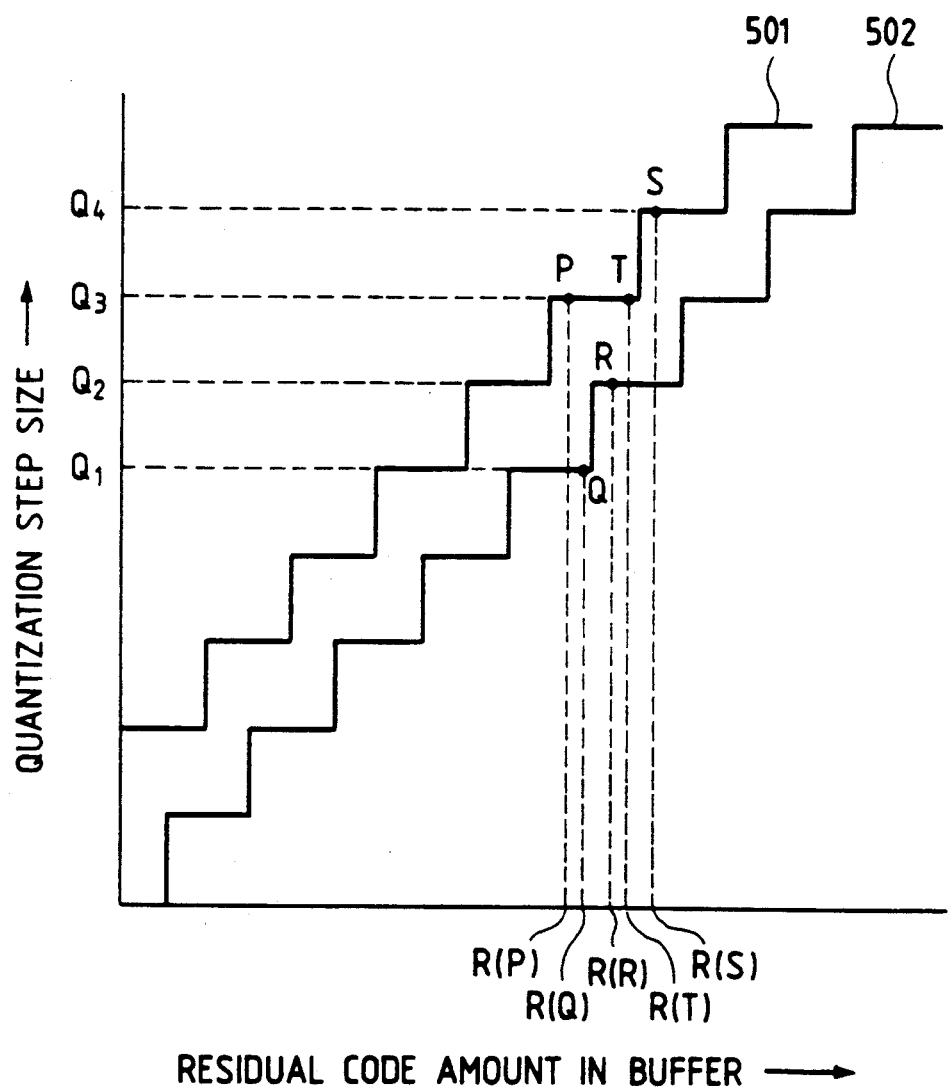
FIG. 6 illustrates functions for deriving values of quantization step size in accordance with region boundary detection results and values of buffer residual code amount.

Referring again to FIG. 2, the quantization step size calculation section 104' receives as inputs thereto the signal 137 (expressing the current value of buffer residual code quantity, at the start of encoding each block) and also the signal 142 (expressing the current value of the region boundary detection result), and outputs a corresponding signal 135 which designates the quantization step size, in accordance with that combination of values of signals 137 and 142. The manner in which the quantization step size that is used for each block is determined in accordance with the combination of values of the signals 137 and 142 will be described in greater detail referring to FIG. 6. In FIG. 6, 501 denotes a graph of a function which relates the quantization step size to the residual code quantity remaining in the buffer memory section 110 (that quantity being referred to in the following simply as the buffer residual quantity), for the case in which the value of the region boundary detection result signal 142 is "0", i.e. for the case in which the block that is to be encoded does not lie on a boundary between two different regions as described hereinabove referring to FIG. 4. Numeral 502 similarly denotes a function graph for the case in which the value of the region boundary detection result is "1", i.e. for the case of a region boundary block. The points P, Q, R, S and T in FIG. 6 respectively, correspond to the blocks P, Q, R, S and T shown in FIG. 4, where Q and R are region boundary blocks, and P, S, T are blocks which are not on a region boundary. R(P), R(Q), R(R), R(S), R(T) respectively denote the values of buffer residual quantity at the start of encoding the blocks P, Q, R, S and T. From the buffer residual quantity R(P) at the time of encoding the block P for example, referring to the function graph 501 (since the value of the region boundary detection result signal 142 in this case will be "0") it can be seen that the quantization step size which will be used for processing the block P will be Q3. After the block P has been quantized and encoded, using that step size Q3, it is found that the value of the buffer residual quantity is now R(Q), prior to quantizing and encoding the block Q. The block Q is a region boundary block, so that in this case the value of the region boundary detection result will be "1", and hence, referring to the function graph 502 it is found that the quantization step size corresponding to that buffer residual quantity R(Q) is Q1. In a similar way, the quantization step sizes Q2 and Q3 will be respectively established for use in quantizing the blocks R and T in accordance with the buffer residual quantity values R(R), R(T).

In this way, for the same value of buffer residual quantity, a smaller size of quantization step size is established in the case of a region boundary block, by comparison with the quantization step size that would be established for a block which is not a region boundary block. This is achieved by selecting one of two possible functions which relate quantization step size to buffer residual quantity, with the selection being executed in accordance with the value obtained for the region boundary detection result. Hence, a relatively large amount of code will be generated for each region boundary block, and a relatively small amount of code generated for each block which is not a region boundary block.

The orthogonal transform coefficients 120 for each of the blocks are respectively quantized by the quantizer section 103 in the same way as described for the prior art example hereinabove, using the value of quantization step size that has been calculated for the block by the quantization step size calculation section 104', and corresponding quantization index values 121 are thereby obtained and supplied to the encoding section 109.

It can thus be understood that the present invention overcomes the problem of "mosquito noise" described hereinabove, by selecting the values of quantization step size used for respective blocks, not only in accordance with the amount of code currently remaining in the output buffer, but also in accordance with whether or not it is necessary to use a relatively small quantization step size for quantizing the transform coefficient values derived for the block. That decision as to the step size requirement is based on whether or not the block is located on a region boundary within the picture at which the "mosquito noise" can be anticipated to occur if the step size is made large.

What is claimed is:

1. In a video signal encoding apparatus comprising:
    block conversion means (100) for arranging an input video signal into successive units of blocks, each block formed of a fixed plurality of picture element values;
    means (114) for subtracting an inter-frame prediction signal from a block-arranged input video signal produced from said block conversion means, to obtain an inter-frame prediction error signal;
    orthogonal transform means (102) for executing orthogonal transform processing of said inter-frame prediction error signal to obtain successive orthogonal transform coefficients;
    quantizer means (103) for quantizing said orthogonal transform coefficients to obtain respective quantization index values;
    quantization step size calculation means (104') for calculating, for each of said blocks, a value of quantization step size to be used by said quantizer means in quantizing the block;
    encoding means (109) for encoding said quantization index values and quantization step size values;
    buffer memory means (110) for temporarily holding code data produced from said encoding means, before transfer to an output terminal (139), and for producing an output signal indicative of an amount of residual code data within said buffer memory means;
    dequantizer and inverse transform means (105, 106) for operating on said quantization index values to obtain an inverse orthogonal transform signal;
    means (124) for adding said inter-frame prediction signal to said inverse orthogonal transform signal to obtain a reproduced video signal; and
    means (108, 107) for operating on said reproduced video signal to obtain said inter-frame prediction signal;
    the improvement comprising region boundary detection means (140) for operating on said block-arranged video signal from said block conversion means to derive, for each of said blocks, a corresponding region boundary detection value to indicate whether or not the block lies on a boundary between a region of substantially smooth visual texture and a region in which large-scale changes in video signal level occur, each of said regions consisting of a plurality of said blocks, wherein said quantization step size calculation means (104') calculates said quantization step size for each of said blocks in accordance with said region boundary detection value and said residual amount of code data, in combination.

2. In a video signal encoding apparatus comprising:
    block conversion means (100) for arranging an input video signal into successive units of blocks, each block formed of a fixed plurality of picture element values;
    means (114) for subtracting an inter-frame prediction signal from a block-arranged input video signal produced from said block conversion means, to obtain an inter-frame prediction error signal;
    orthogonal transform means (102) for executing orthogonal transform processing of said inter-frame prediction error signal to obtain successive orthogonal transform coefficients;
    quantizer means (103) for quantizing said orthogonal transform coefficients to obtain respective quantization index values;
    quantization step size calculation means (104') for calculating, for each of said blocks, a value of quantization step size to be used by said quantizer means in quantizing the block;
    encoding means (109) for encoding said quantization index values and quantization step size values;
    buffer memory means (110) for temporarily holding code data produced from said encoding means, before transfer to an output terminal (139), and for producing an output signal indicative of an amount of residual code data within said buffer memory means;
    dequantizer and inverse transform means (105, 106) for operating on said quantization index values to obtain an inverse orthogonal transform signal;
    means (124) for adding said inter-frame prediction signal to said inverse orthogonal transform signal to obtain a reproduced video signal; and
    means (108, 107) for operating on said reproduced video signal to obtain said inter-frame prediction signal;
    the improvement comprising region boundary detection means (140) for operating on said block-arranged video signal from said block conversion means to derive, for each of said blocks, a corresponding region boundary detection value to indicate whether or not the block lies on a boundary between a region of substantially smooth visual texture and a region in which large-scale changes in video signal level occur, wherein said quantization step size calculation means (104') calculates said quantization step size for each of said blocks in accordance with said region boundary detection value and said residual amount of code data, in combination, wherein said region boundary detection means comprises:
    feature parameter extraction means (201) for extracting, for each of said blocks, a corresponding value of a parameter representative of visual characteristics;
    comparator means (202) for comparing each of said parameter values with a predetermined threshold value, for assigning each of said blocks to one of a plurality of different classification values of picture characteristics; and boundary judgement means (203) for operating upon (203) for operating upon said classification values to judge, for each of said blocks, whether or not said block is positioned on a boundary between respectively different regions of a picture represented by said input video signal.

3. A video signal encoding apparatus according to claim 2, wherein said feature parameter extraction means derives, for each of said blocks, a dispersion value which has a small magnitude in the case of a block within a picture region that is substantially visually smooth, and has a large magnitude in the case of a block within a picture region which is visually extremely rough.

* * * * *